United States Patent
De Mattia

(10) Patent No.: US 9,463,940 B2
(45) Date of Patent: Oct. 11, 2016

(54) METHOD FOR PRODUCING A FIBER PREFORM BY MEANS OF WINDING AND SET OF TOOLS FOR IMPLEMENTING THE METHOD

(71) Applicant: Airbus Operations (SAS), Toulouse (FR)

(72) Inventor: Denis De Mattia, Basse Goulaine (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 219 days.

(21) Appl. No.: 14/277,230

(22) Filed: May 14, 2014

(65) Prior Publication Data
US 2014/0338837 A1    Nov. 20, 2014

(30) Foreign Application Priority Data

May 15, 2013 (FR) .................................... 13 54348

(51) Int. Cl.
| | |
|---|---|
| *B29C 70/32* | (2006.01) |
| *B29C 53/56* | (2006.01) |
| *B29C 53/80* | (2006.01) |
| *B65H 5/28* | (2006.01) |
| *B29B 11/16* | (2006.01) |

(52) U.S. Cl.
CPC ................. *B65H 5/28* (2013.01); *B29B 11/16* (2013.01); *B29C 53/564* (2013.01); *B29C 53/8016* (2013.01); *B29C 70/32* (2013.01); *B65H 2404/00* (2013.01); *Y02T 50/433* (2013.01)

(58) Field of Classification Search
CPC . B65H 2404/00; B29C 70/32; B29C 70/323; B29C 70/326; B29C 53/562; B29C 53/564; B29C 53/8008; B29C 53/8016; B29C 53/82; B29B 11/16; Y02T 50/533
USPC ................ 156/169, 170, 172, 173, 175, 194
See application file for complete search history.

(56) References Cited

U.S. PATENT DOCUMENTS

| | | | | |
|---|---|---|---|---|
| 3,300,355 A | * | 1/1967 | Adams .................... | B29C 33/00 156/189 |
| 6,050,315 A | | 4/2000 | Deckers et al. | |
| 6,290,799 B1 | | 9/2001 | Deckers et al. | |
| 6,490,990 B1 | * | 12/2002 | Hamlyn ................ | B29C 53/566 114/357 |

FOREIGN PATENT DOCUMENTS

EP    0953433    11/1999

OTHER PUBLICATIONS

French Search Report, 20114-01-27.

* cited by examiner

*Primary Examiner* — Carson Gross
(74) *Attorney, Agent, or Firm* — Greer, Burns & Crain, Ltd.

(57) ABSTRACT

A method for producing a fiber preform by winding at least one thread in a groove of a mold. The method involves using a flexible element which is capable of becoming deformed by means of flexion, in a plane which contains the winding axis, in order to penetrate into the groove in order to push the sections of the thread(s) towards the base of the groove and/or towards zones which cannot be accessed directly by the thread(s). A set of tools for implementing the method is also provided.

13 Claims, 5 Drawing Sheets

METHOD FOR PRODUCING A FIBER PREFORM BY MEANS OF WINDING AND SET OF TOOLS FOR IMPLEMENTING THE METHOD

CROSS-REFERENCES TO RELATED APPLICATIONS

This application claims the benefit of the French patent application No. 13 54348 filed on May 15, 2013, the entire disclosures of which are incorporated herein by way of reference.

BACKGROUND OF THE INVENTION

The present invention relates to a method for producing a fiber preform by means of winding and a set of tools for implementing the method.

In FIGS. 1 and 2, a frame 10 of an aircraft window produced from composite material has been illustrated. This frame 10 is obtained from a fiber preform comprising a plurality of fiber sub-preforms.

For the remainder of the description, the term "preform" is intended to refer both to a preform and to a sub-preform which is capable of being associated with other sub-preforms in order to form a preform.

Some preforms 12 of the frame 10 have a continuous profile over the entire periphery of the frame, in particular in order to limit the radial deformations which tend to increase the perimeter of the frame.

According to an embodiment illustrated in FIGS. 3 to 5, a preform 12 is obtained from at least one thread 14, in particular of carbon, wound with a degree of tension about a winding axis 16 between two flanges 18.1 and 18.2.

According to this construction technique, the cross-section of the preform 12 in a plane which contains the winding axis 16 is substantially constant over the entire periphery of the preform.

The term "thread" is intended to refer to at least one filament. According to an embodiment, a thread of carbon is a strand of several thousands of filaments of carbon of a few micrometers (for example, in the order of 7 µm).

Advantageously, the filaments are powdered resins.

After the winding phase, the preform 12 is subjected to a thermal cycle in order to confer thereon a degree of cohesion as a result of the powdered resin in order to be able to be manipulated.

Subsequently, the different preforms are assembled and are subjected to a thermal cycle which is intended to achieve the polymerization of the assembly in order to obtain a frame.

According to a significant constraint, each preform must have a thread density which is homogeneous over the entire cross-section and over the entire circumference. Furthermore, each cross-section of the preform must have a profile in accordance with that desired, in particular in the region of the corners.

According to an embodiment which is not illustrated, the cross-section of the preform may be rectangular and delimited by two faces which are planar and perpendicular relative to the winding axis. For this geometry, a homogeneous thread density is obtained over the entire cross-section and over the entire circumference.

According to other variants, the preform 12 may have L-shaped, S-shaped or other cross-sections.

In this instance, the preform 12 comprises two opposing faces 20.1 and 20.2 which are non-planar and spaced apart.

In a parallel state, the flanges 18.1 and 18.2 delimit a groove 22 with two faces 24.1 and 24.2 which complement the faces 20.1 and 20.2 of the preform, respectively.

For these geometries, some zones 26 of the groove 22 are difficult to access when the thread 14 is wound given the tension thereof. These zones 26 are illustrated in grey in FIG. 5.

Owing to the presence of these zones 26 which are difficult to access, the density of the threads is not homogeneous over the entire cross-section, which leads in particular to shape defects and non-conformity of the component in terms of geometry and dimensions.

In order to overcome these disadvantages, a first operating method of the prior art involves subdividing the preform into sub-preforms 28, 28', 28" which are obtained in accordance with the winding technique described above, each sub-preform which is referred to as being simple having a geometry which is compatible with good filling, that is to say, with opposing faces 20.1 and 20.2 which are planar and perpendicular relative to the winding axis 16. Subsequently, the sub-preforms are assembled in a set of tools during a stamping operation, as illustrated in FIG. 6. This stamping operation involves compressing the sub-preforms 28, 28', 28" between two dies 30.1 and 30.2 in order to cause the layers of threads to slide laterally in order to obtain the definitive preform.

Even if this allows some defects to be overcome, this operating method is not satisfactory since it leads to a multiplication of the number of winding operations which tends to increase the cost of the component obtained and the time required for it to be obtained.

According to another operating method of the prior art illustrated in FIG. 7, the winding is carried out between two flanges 18.1 and 18.2 with a spacing between the two faces 24.1 and 24.2 greater than the theoretical value. In this manner, a gap e greater than 0 is provided between the two flanges 18.1 and 18.2. After the winding operation, the two flanges are moved together in order to eliminate the gap e and to obtain a spacing between the two faces 24.1 and 24.2 in accordance with the theoretical value. This movement together is intended to overcome the lack of threads in the zones 26. However, tests have shown that the zones 26 are not adequately filled and that the geometries in these zones 26 are not sufficiently precise (insufficiently distinct angle).

SUMMARY OF THE INVENTION

Therefore, an object of the present invention is to overcome the disadvantages of the prior art.

To this end, the invention proposes a method for producing a fiber preform involving winding at least one thread about a winding axis in a groove of a mould, characterized in that it involves using a flexible element which is capable of becoming deformed by means of flexion, in a plane which contains the winding axis, in order to penetrate into the groove in order to push the sections of the thread(s) towards the base of the groove and/or towards zones which cannot be accessed directly by the thread(s).

This solution allows a homogeneous density of thread sections to be obtained in the region of each section of the preform. It also enables the conformity of the component to be ensured in terms of geometry and dimensions.

Advantageously, the method involves using a flexible element in the form of a thin disc having an axis which is arranged in a plane which contains the winding axis. In this instance, the thin disc preferably pivots freely so that the periphery of the thin disc rolls on the thread(s).

Advantageously, the flexible element is fixedly joined to a movable support so that the free end of the flexible element moves away from the winding axis during the filling of the groove.

The invention also proposes a set of tools for implementing the method of the invention. This set of tools is characterized in that it comprises at least one flexible element which is arranged so as to penetrate inside the groove in which the thread(s) is/are wound, the flexible element which is capable of becoming deformed by means of flexion in a plane which contains the winding axis in order to penetrate into the groove, the flexible element comprising a free end which is capable of moving into contact with the thread(s) in order to push them towards the base of the groove and/or towards zones which are not directly accessible to the thread(s).

Advantageously, the flexible element is a thin disc having an axis which is arranged in a plane which contains the winding axis.

Preferably, the axis of the thin disc pivots freely so that the periphery of the thin disc rolls on the thread(s).

Advantageously, the flexible element is fixedly joined to a movable support. Preferably, return means are provided in order to keep the free end of the flexible element in contact with the thread(s).

BRIEF DESCRIPTION OF THE DRAWINGS

Other features and advantages will be appreciated from the following description of the invention, which description is given purely by way of example and with reference to the appended drawings, in which.

DETAILED DESCRIPTION OF THE PREFERRED EMBODIMENTS

Figure 1:
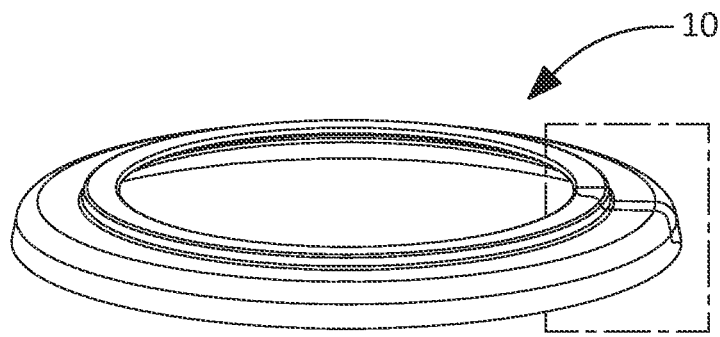
FIG. 1 is a perspective view of a frame of an aircraft window.
Figure 2:
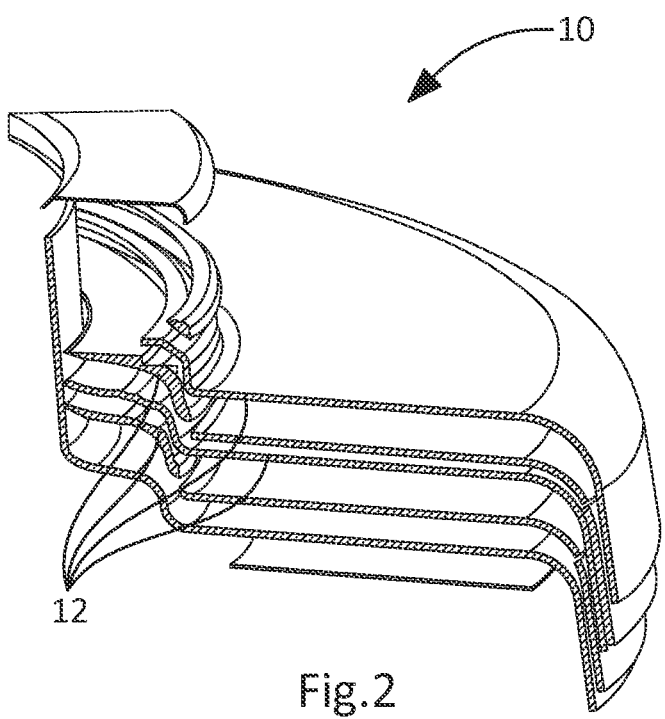
FIG. 2 is an exploded perspective view of the various constituents of the frame of FIG. 1.
Figure 3:
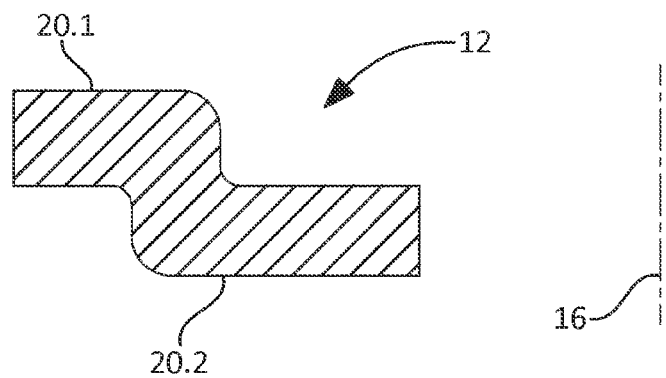
FIG. 3 is a cross-section of a preform used to produce a frame.
Figure 4:
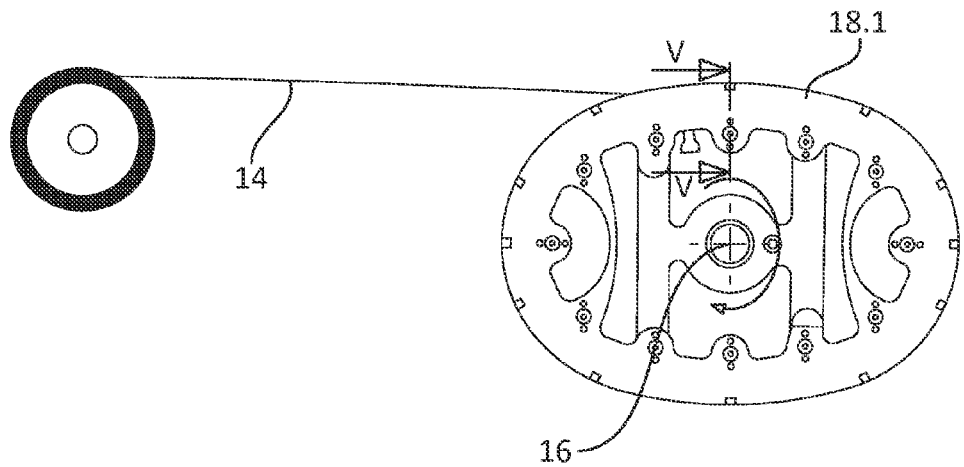
FIG. 4 is a side view illustrating a set of tools for producing the preform of FIG. 3 by a thread being wound.
Figure 5:
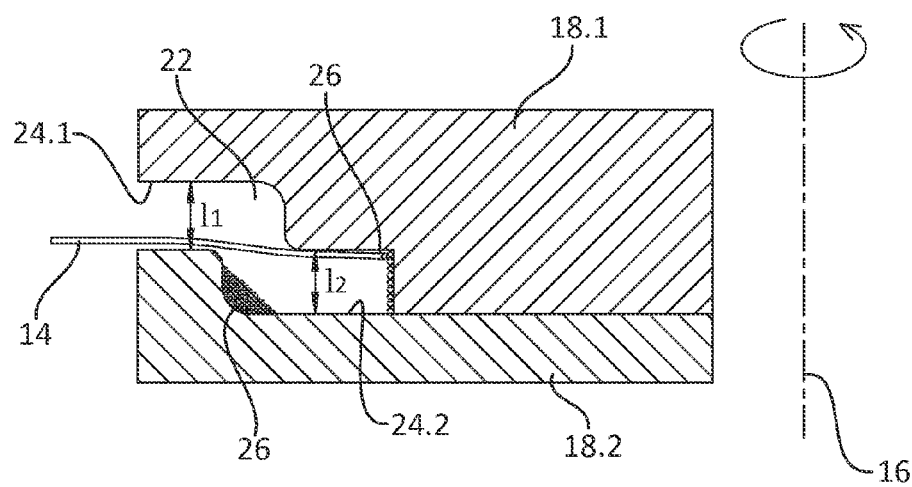
FIG. 5 is a cross-section along line V-V of FIG. 4.
Figure 6:
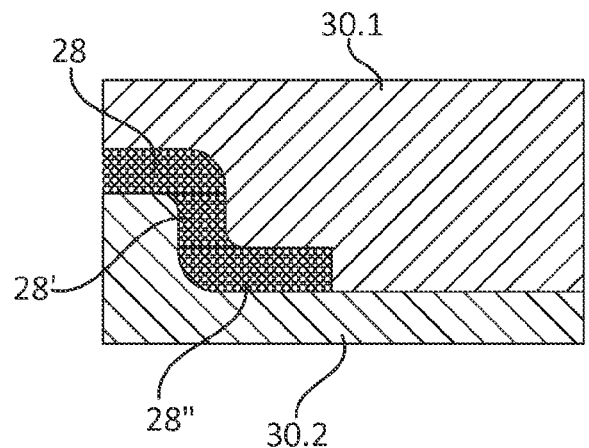
FIG. 6 is a partial cross-section of a set of stamping tools for producing a preform according to a first operating method of the prior art.
Figure 7:
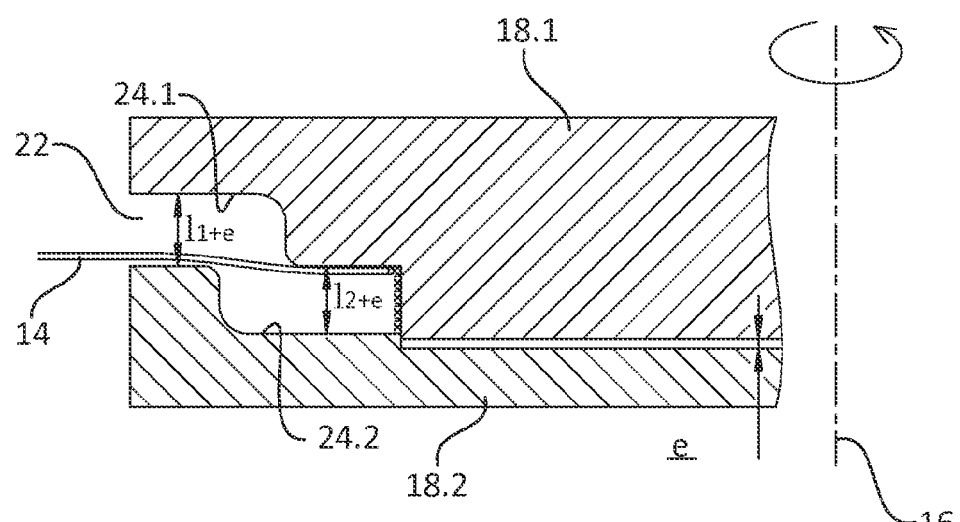
FIG. 7 is a partial cross-section of a set of tools for producing a preform according to another operating method of the prior art.
Figure 8:
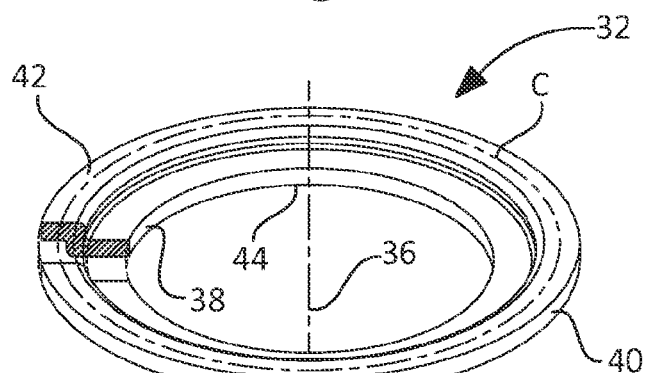
FIG. 8 is a perspective view of a preform produced from the method of the invention.
Figure 9:
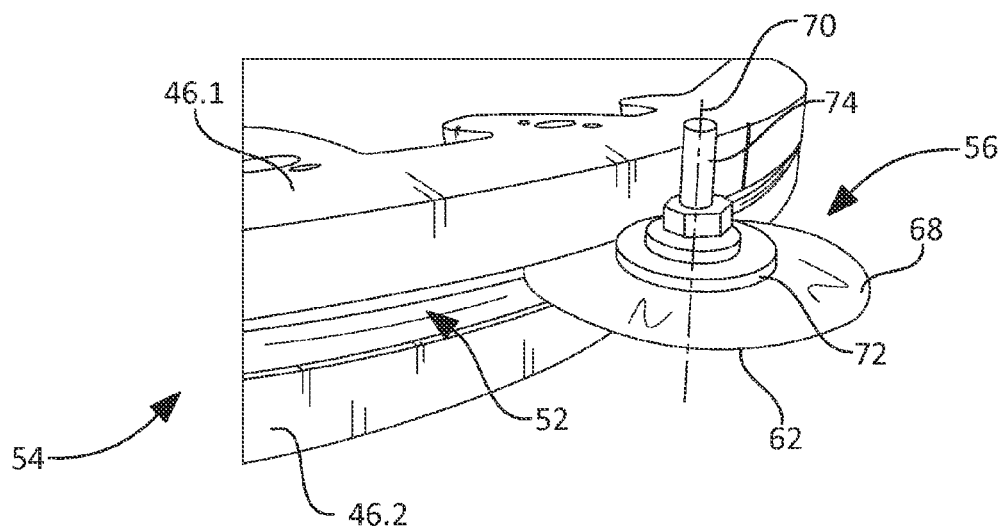
FIG. 9 is a perspective view of a portion of a set of tools which allows a preform to be produced which illustrates the invention.

FIG. 8 shows a preform 32 which has been obtained by winding at least one thread 34 about a winding axis 36.

In planes which contain the winding axis 36, the preform has S-shaped cross-sections. In this manner, each cross-section comprises an inner side which forms the inner edge 38 of the preform 32, an outer side which forms the outer edge 40 of the preform, an upper curved line in the form of steps which forms the upper face 42 of the preform and a lower curved line in the form of steps which forms the lower face 44 of the preform.

The preform 32 has a circular C-shaped contour which is centered on the winding axis 36. The preform is thus said to be formed by means of revolution.

Advantageously, the thread 34 is of powdered resin. According to an embodiment, the thread 34 is of carbon.

According to an application, the preform 32 may be associated with other elements such as other preforms in order to form a frame of an aircraft window. However, the invention is not limited to this application.

Furthermore, the preform may have a non-circular contour. In this manner, the contour of the preform may comprise at least a curved portion and at least a rectilinear portion.

Finally, the invention is not limited to the shape having an S-shaped cross-section. In this manner, the upper and lower faces 42 and 44 may have other shapes, which are non-planar and/or non-perpendicular relative to the winding axis 36.

The material of the thread and the nature of the resin may vary, in particular in accordance with the desired characteristics.

FIGS. 9, 10, 11A to 11C illustrate a set of tools for producing a preform 32.

This set of tools comprises two flanges 46.1 and 46.2 which are capable of pivoting about the winding axis 36 and thread supply means 48.

The two flanges 46.1 and 46.2 comprise faces 50.1 and 50.2, respectively, which are complementary to the upper and lower faces 42 and 44 of the preform to be obtained so that, when the two flanges 46.1 and 46.2 are assembled, they define a groove 52 whose geometry and dimensions are identical to those of the preform 42.

Generally, the set of tools comprises a mould 54 which is capable of pivoting about the winding axis 36, with a peripheral groove 52 whose volume is identical to that of the preform to be produced. In this manner, the groove 52 is delimited by the two faces 50.1 and 50.2 and optionally a base which corresponds to the inner edge 38 of the preform.

The thread supply means 48 may unwind at least one thread 34. In a variant, they may unwind a plurality of threads.

Advantageously, the supply means 48 ensure a degree of tension of the thread, for example, in the order of from 3 to 5 daN.

The thread supply means, the mould and the means for rotating them are not described in greater detail since they may be identical to those of the prior art.

Figure 11A:
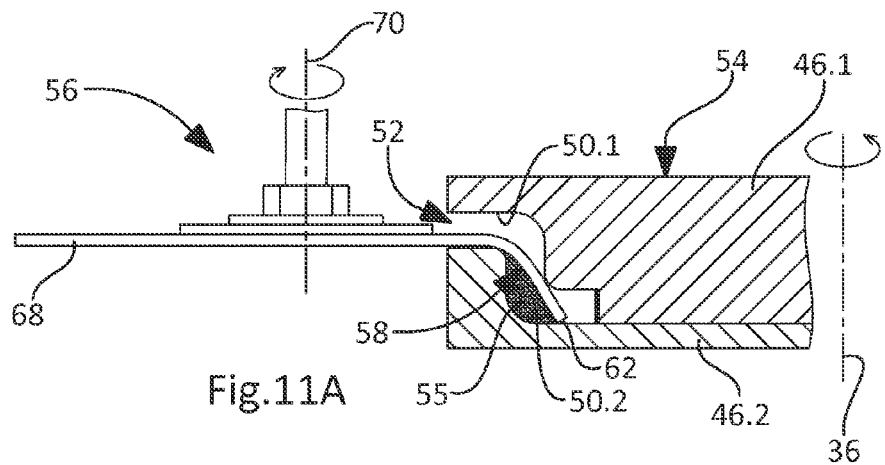
Figure 11B:
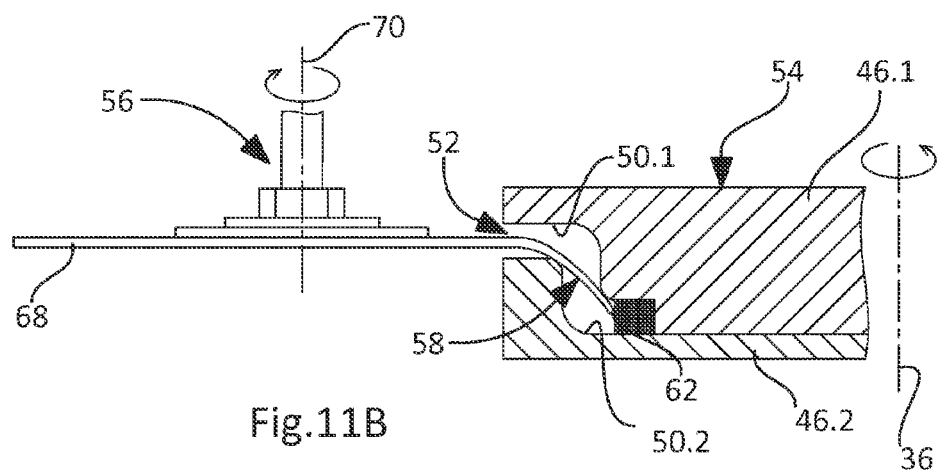
Figure 11C:
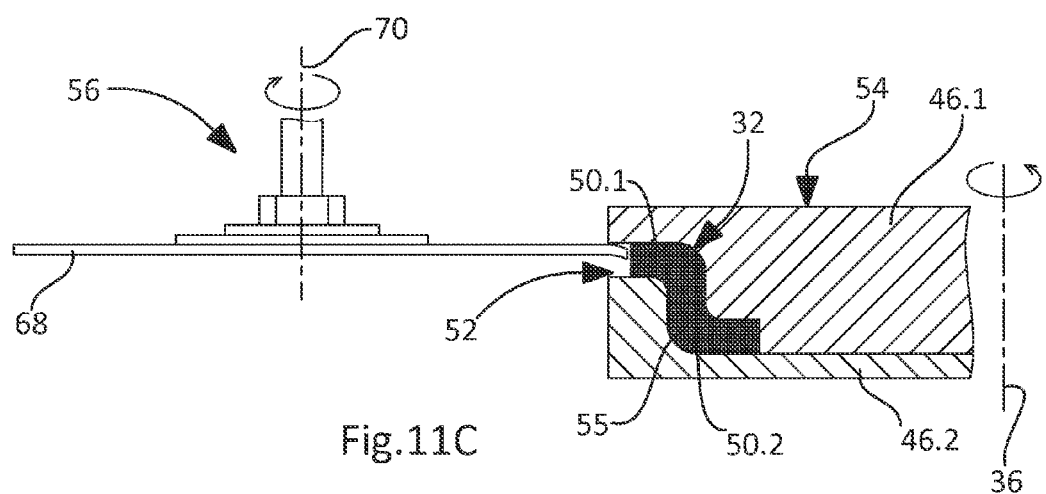

As illustrated in FIGS. 11A to 11C, the thread 34 is wound in the groove 52 in order to form layers which are superimposed on each other extending from the inner edge 38 as far as the outer edge 40. An optimum filling of the preform involves distributing, for each section of the preform and for each layer, the sections of the thread over the entire space between the two faces 50.1 and 50.2 of the groove 52.

Taking into account the tension and the shapes of the faces 50.1 and 50.2, the groove 52 comprises at least one zone 55 (in grey) which is not directly accessible to the thread 34 when it is wound.

The thread 34 comes into contact with the other sections of the thread which are already deposited at a tangency location T.

According to the invention, the set of tools comprises a device 56 for pushing the sections of the thread deposited in the groove towards the winding axis and/or towards the zone(s) 55 which may or may not be directly accessible to the thread.

This device 56 comprises at least one flexible element 58 so as to penetrate inside the groove 52, the flexible element being fixedly joined to a support 60 and comprising a free end 62 which is capable of coming into contact with the last deposited sections of the thread(s).

The term "flexible" is intended to be understood to mean that the element 58 is capable of becoming deformed by means of flexion, in a plane which contains the winding axis 36, in order to penetrate into the groove 52. However, when it is not deformed by means of flexion, the element 58 cannot be compressed in a radial direction (perpendicular to the winding axis) so that the length between the support 60 and the free end 62 is constant.

The tangency location T is preferably arranged between the thread supply means 48 and the device 56. Thus, the flexible element 58 tends to move the thread section shortly after it is in contact with the other thread sections already deposited.

In a variant, the device 56 is arranged upstream of the tangency location T. In this instance, the flexible element 58 is in contact with the sections of the thread(s) already deposited and tends to orientate the section of the thread(s) just before the section is in contact with the other sections which are already deposited.

Advantageously, the support 60 is movable. As illustrated in FIGS. 11A to 11C, during the filling, the support 60 tends to move so that the free end 62 moves away from the winding axis 36 during the filling of the groove 52. Preferably, the pressure applied by the free end 62 to the sections of the thread(s) already deposited is substantially constant.

According to an embodiment, the set of tools comprises a sliding member 64 which extends radially and along which the support 60 can slide.

Preferably, the support 60 can slide freely. In this instance, the set of tools comprises a return member 66, such as a compression spring, for example, which tend to maintain the free end 62 in contact with the sections of the thread(s) already deposited.

According to a feature of the invention, the flexible element 58 is a thin disc 68 of flexible material with an axis 70 which is arranged in a plane which contains the winding axis 36. This configuration confers on the flexible element 58 a high level of rigidity in a direction tangential to the winding of the thread(s).

According to an embodiment, the thin disc 68 has a thickness between approximately 0.2 and 0.3 mm and a diameter in the order of 100 mm. The thin disc 68 is a polyvinyl chloride.

The axis 70 of the thin disc is parallel with the winding axis 36. However, the axis 70 may not be parallel and may become self-orientated in a plane which contains the winding axis 36.

According to another feature of the invention, the thin disc 68 can pivot freely about the axis 70 thereof.

According to an embodiment, the thin disc 68 comprises a core 72 which is extended with a rod 74 which is perpendicular to the thin disc 68 and which forms the rotation axis 70 of the disc. In a variant, the core 72 may extend at one side and the other of the disc with two rods which are perpendicular to the thin disc 68 and which form the rotation axis 70.

Preferably, the rod 74 pivots freely, for example, in a bearing which is fixedly joined to the support 60.

Figure 10:
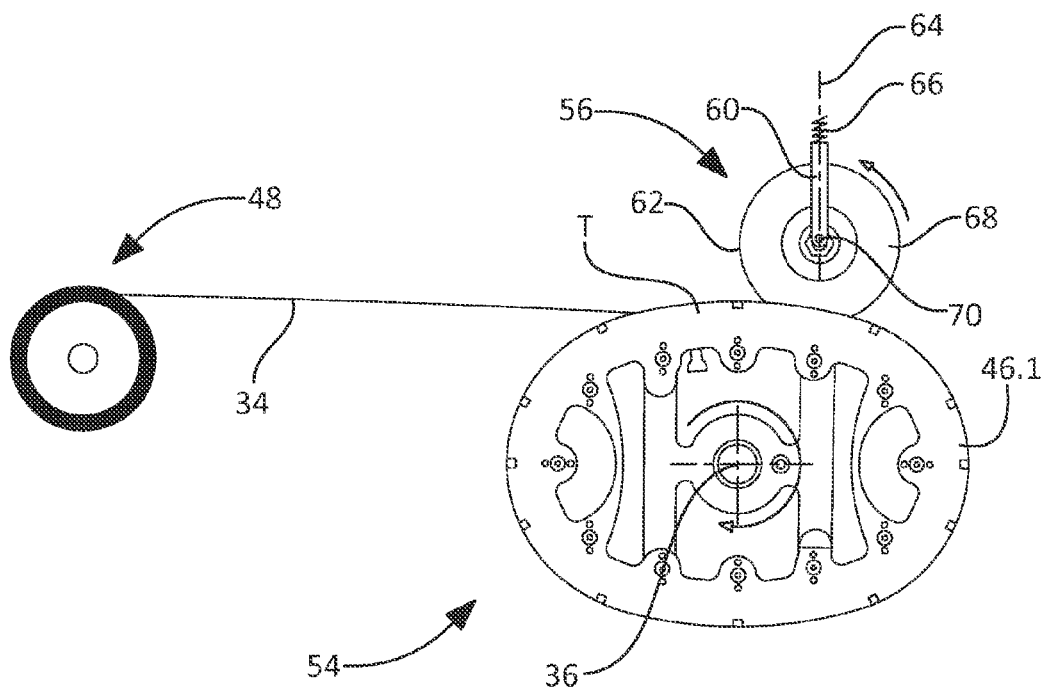
FIG. 10 is a side view of the set of tools of FIG. 9, and FIGS. 11A to 11C are sections illustrating the set of tools of FIG. 9 at different stages of the filling operation.

As illustrated in FIG. 10, when the mould is rotated, this brings about the rotation of the disc which rotates about itself as a result in particular of the friction generated by the contact between the upper and/or lower face(s) of the thin disc 68 with the mould 54. Consequently, the free end 62 which corresponds to the periphery of the disc rolls on the sections of the thread(s) already deposited, which tends to significantly reduce the occurrences of friction. It is not necessary for the peripheral speed of the disc to be equal to the unwinding speed of the thread. There may be slight friction in this regard as a result of a speed discrepancy. In this manner, the thin disc may roll with or without friction on the thread(s) which is/are already wound.

The material and the thickness of the thin disc 68 allow it to become deformed in order to penetrate into the groove 52. The portion of the thin disc inserted into the groove moves and pushes the thread(s), preventing their natural stacking action, compresses them slightly so that the thread(s) fill the groove 52 without leaving zones 55 which are not filled as is the case in the prior art.

The method of the invention involves using a flexible element 58 which penetrates into the groove and which pushes the sections of the wound thread(s) towards the base of the groove and/or towards the zones which are not directly accessible to the thread(s).

In this manner, the method of the invention allows the preform to be obtained directly without the need to produce sub-preforms having a simple shape which are then assembled.

Finally, the method of the invention allows a homogeneous density of thread sections to be obtained for each section.

Subsequently, the preform may be at least partially polymerized so as to be able to be manipulated. It is then removed from the mould 54, for example, by moving apart the two flanges 46.1 and 46.2. The preform formed in this manner may be associated with other preforms in order to form a component of composite material such as a frame of an aircraft window, for example.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for producing a fiber preform comprising:
   winding at least one thread about a winding axis in a groove of a mold,
   using a flexible element which is deformable by means of flexion, in a plane containing the winding axis,
   penetrating the flexible element into the groove, and
   pushing sections of the thread towards at least one of a base of the groove and zones which cannot be accessed directly by the thread.

2. The method according to claim 1, wherein the flexible element is in the form of a thin disc with an axis arranged in a plane containing the winding axis.

3. The method according to claim 2, wherein the thin disc pivots freely so that a periphery of the thin disc rolls on the thread.

4. The method according to claim 1, wherein the flexible element is fixedly joined to a support and comprises a free end capable of coming into contact with the thread, the support being movable so that the free end moves away from the winding axis during the winding of the at least one thread about the winding axis in the groove of the mold.

5. The method according to claim 4, including the step of moving the support so that the pressure applied by the free end of the flexible element to the thread is substantially constant.

6. A set of tools for implementing a method for producing a fiber preform comprising:
   a thread supply,
   a mold having a groove, in which at least one thread from the thread supply can be wound about a winding axis,
   at least one flexible element being deformable by means of flexion in a plane containing the winding axis and being arranged to penetrate into the groove, and
   the flexible element comprising a free end which is arranged to be movable into contact with the thread to push the thread towards at least one of a base of the groove and zones which are not directly accessible to the thread.

7. The set of tools according to claim 6, wherein the flexible element is a thin disc having an axis arranged in a plane containing the winding axis.

8. The set of tools according to claim 7, wherein the axis of the thin disc pivots freely so that a periphery of the thin disc rolls on the thread which is already wound.

9. The set of tools according to claim 7, wherein the thin disc is made of polyvinyl chloride.

10. The set of tools according to claim 7, wherein the thin disc has a thickness between approximately 0.2 mm and 0.3 mm.

11. The set of tools according to claim 6, wherein the flexible element is fixedly joined to a movable support.

12. The set of tools according to claim 11, further comprising a sliding member which extends radially and along which the support can slide.

13. The set of tools according to claim 12, further comprising a return member which keeps the free end of the flexible element in contact with the thread.

* * * * *